United States Patent [19]

Klaren

[11] 4,401,152

[45] Aug. 30, 1983

[54] HEAT EXCHANGER HAVING A PLURALITY OF VERTICAL PIPES FOR UPWARD PASSAGE OF A FIRST HEAT-EXCHANGING MEDIUM

[75] Inventor: Dick G. Klaren, IJmuiden, Netherlands

[73] Assignee: Esmil BV, Amsterdam, Netherlands

[21] Appl. No.: 294,022

[22] Filed: Aug. 18, 1981

[30] Foreign Application Priority Data

Sep. 5, 1980 [NL] Netherlands ................ 8005022

[51] Int. Cl.$^3$ ............................................. F28D 13/00
[52] U.S. Cl. ............................. 165/104.16; 122/4 D; 422/146
[58] Field of Search ............... 165/104.16; 422/146; 122/4 D

[56] References Cited

U.S. PATENT DOCUMENTS 3,991,816 11/1976 Klaren ................ 165/104.16 X
4,300,625 11/1981 Mikhailov ............ 165/104.16 X Primary Examiner—Albert W. Davis, Jr.
Attorney, Agent, or Firm—Stevens, Davis, Miller & Mosher

[57] ABSTRACT

Heat exchanger having a plurality of vertical pipes for upward passage of a first heat-exchanging medium, at least one compartment for passage of a second heat-exchanging medium through which compartment said pipes extend, a lower chamber through which said first medium passes and into which said pipes open for admission to the pipes of said first medium, and a flow distribution element adapted to distribute the flow of said first medium in said lower chamber to the pipes. A fluidizable particulate material is in operation, is maintained in a fluidized state in the pipes by the flow of the first medium. The pipes have inlet elements extending downwardly into said lower chamber with their lowermost ends open. Stabilization openings are provided into said inlet elements above said open lowermost ends thereof. To prevent blocking of the stabilization openings by dirt, these are separated, outside the inlet elements, from the said open lowermost ends of the inlet elements by at least one screen which allows flow of the first medium to the stabilization openings.

4 Claims, 3 Drawing Figures

HEAT EXCHANGER HAVING A PLURALITY OF VERTICAL PIPES FOR UPWARD PASSAGE OF A FIRST HEAT-EXCHANGING MEDIUM

BACKGROUND OF THE INVENTION

1. FIELD OF THE INVENTION

The invention relates to a heat exchanger having a plurality of vertical pipes for upward passage of a first heat-exchanging medium, at least one compartment for passage of a second heat-exchanging medium through which said pipes extend, a lower chamber through which said first medium passes and into which said pipes open for admission to the pipes of said first medium and a flow distribution element adapted to distribute the flow of the first medium in the lower chamber to the pipes. A fluidizable particulate material is present which, in operation of the heat exchanger, is maintained in a fluidized state in the pipes by the flow of the first medium. The pipes have inlet elements extending downwardly into said lower chamber with their lowermost ends open. Stabilization openings are provided from the lower chamber into the inlet elements above the lowermost ends of the elements.

2. DESCRIPTION OF THE PRIOR ART

A heat exchanger of the kind described above is disclosed in published British Patent Application No. GB 1,592,232. In such a heat exchanger where the first heat exchanging medium is conducted through a mass of fluidized particulate material in a number of vertical pipes, particular care must always be taken as to the stability of the process. If preferred flows occur through one or a few of the pipes the fluidized material will expand in these pipes and move over to the other pipes via a common upper box into which all the pipes open. The mass of fluidized particles will then collapse in these other pipes so that the flow of the first heat exchanging medium will be concentrated entirely in the pipe or pipes of preferred flow. This leads to the heat exchanger operating only partially and less than optimally, and increases the likelihood of the pipe walls being dirtied.

Various measures have already been incorporated for improving the stability of the process, such as fitting the flow distribution element for the lower chamber and extending the pipes by means of the inlet elements which extend into the lower chamber. Improvement is also obtained by inserting the "stabilization openings" in the walls of these inlet elements. It should be noted, furthermore, that proposals have been made for improving the stability of the flow through the various pipes by including throttle openings at the bottom of each pipe or by impeding cross travel of the particulate material in the upper chamber into which the top ends of the pipes open.

Each of these measures can contribute towards improving stability. However, it has been found that under certain circumstances instability in the flow pattern may be the result of the blockage of one or more of the stabilization openings in the inlet elements.

SUMMARY OF THE INVENTION

The object of the invention is to prevent or minimize destabilization caused by such blockages.

We have found that the blockage is caused when solids are formed and deposited elsewhere in the system, particularly at the top of the heat exchanger. If the first heat exchanging medium is water, the solids may, for example, consist of boiler fur or scale which first forms against a wall and then is released from it in the form of lumps or flakes. This release may be caused by temperature variations in the installation, when the boiler fur lumps or flakes fall from the wall into the fluidized bed and usually remain floating in it.

In some circumstances such as a chance breakdown of the process, such lumps may temporarily move downwards and end up in the lower chamber, where they may remain floating around the inlet elements. In the course of time this may lead to collection at one or more of the stabilization openings, with the final result that it is clogged.

Although stabilization openings are generally very much smaller than the main inlet openings in the inlet elements, a disproportionately large part of the flow of the first medium has been found to pass through the stabilization openings. The blockage of an opening of this kind also has direct consequences on the speed of flow in the pipe concerned and therefore on the degree of expansion in the particulate material in that pipe, leading in turn to instability.

The present invention consists in that the stabilization openings are separated outside the inlet elements, from the lowest inlet openings of these inlet elements by at least one screen which allows flow of the first medium to the stabilization openings.

The apertures of the screen should preferably be smaller than the longitudinal dimensions of the stabilization openings.

The screen prevents solids arriving in the lower chamber from reaching the neighbourhood of the stabilization openings, unless their dimensions are so small that they can pass through the screen. In that case, however, they will also pass through the stabilization openings without dirtying them and alowing them to clog.

The area of the screen will usually be appreciably larger than the total area of the stabilization openings. The risk of the screen silting up is therefore substantially less than for the stabilization openings themselves. Nonetheless this risk can be still further reduced by increasing the surface area of the screen. It may, for example, have the shape of a basket enclosing the stabilization openings. Another possibility is for the screen to have a box shape, with top, bottom and sides around the stabilization openings.

BRIEF INTRODUCTION OF THE DRAWINGS

Preferred embodiments of the invention will now be described by way of example only and with reference to the accompanying drawings, in which each of the three figures is a diagrammatic view of part of a different heat exchanger embodying the invention.

DESCRIPTION OF THE PREFERRED EMBODIMENT

Figure 1:
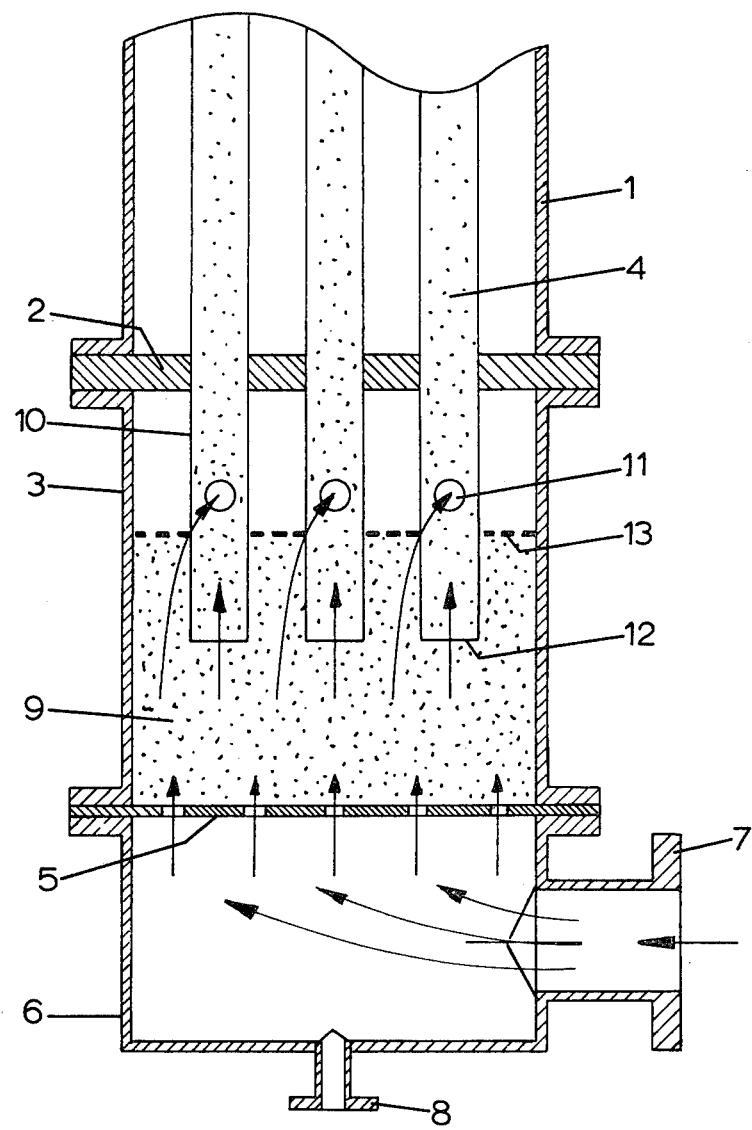

In FIG. 1 there is shown the bottom part of the heat exchanger illustrated in British Patent Application No. GB 1,592,232 which has now been provided with the improvement in accordance with the invention.

This heat exchanger has a compartment 1 through which a second heat exchanging medium flows. The supply and discharge openings for this are not shown in the figure. The compartment 1 is separated by a partition 2 from a lower chamber or box 3 into which a number of vertical pipes 4 open. The pipes 4 extend vertically upwardly through the compartment 1. The lower box 3 is in direct connection via a perforated base plate 5 with a distribution box 6, into which a supply opening 7 opens out. The plate 5 acts as a distribution element which achieves a more uniform flow of the first medium to the pipes 4. A discharge opening 8 is also shown; this is closed off under normal operation but can be used for washing the apparatus through.

The lower box 3 and the pipes 4 contain a mass of particulate material 9 which is fluidized when the first heat exchanging medium flows upwards from the supply opening 7 through the distribution box 6, the base plate 5, the chest beneath 9 and the pipes 4. The perforations in the base plate 5 are dimensioned so that the fluidizable particles cannot pass into the distribution box 6 and in operation the speed of the flow of the first heat exchanging medium is set sufficiently high that these particles remain in the fluidized state both in the lower box 3 and in the pipes 4. In order to achieve a stable flow in all the pipes 4, these are equipped with inlet pieces or extensions 10 which extend downwardly into the fluidized mass 9 in the lower chamber to the open lower ends 12. Stablization openings 11 are provided in the walls of the inlet pieces. A leakage flow of the first heat exchanging medium through the stabilization openings, equalizes the level of the granular mass in the lower box, which produces a more regular flow in each of the pipes.

As described above, lumps or flakes of boiler fur or scale that sink down into the lower box 3 via one or more of the pipes 4 may in this apparatus concentrate at one or more of the stabilization openings 11 and block them. In order to avoid this, a screen 13 (e.g. a wire gauze) is fitted beneath the level of the stabilization openings and above the lower ends 11 of the pipes 4, in accordance with the invention. This screen extends the full width of the lower box 3 and thus separates the openings 11 from the ends 12 of the pipes (outside the pipes 4). Flakes of boiler fur or other coarse dirt are held back by this screen 13 and cannot block the stabilization openings 11.

Figure 2:
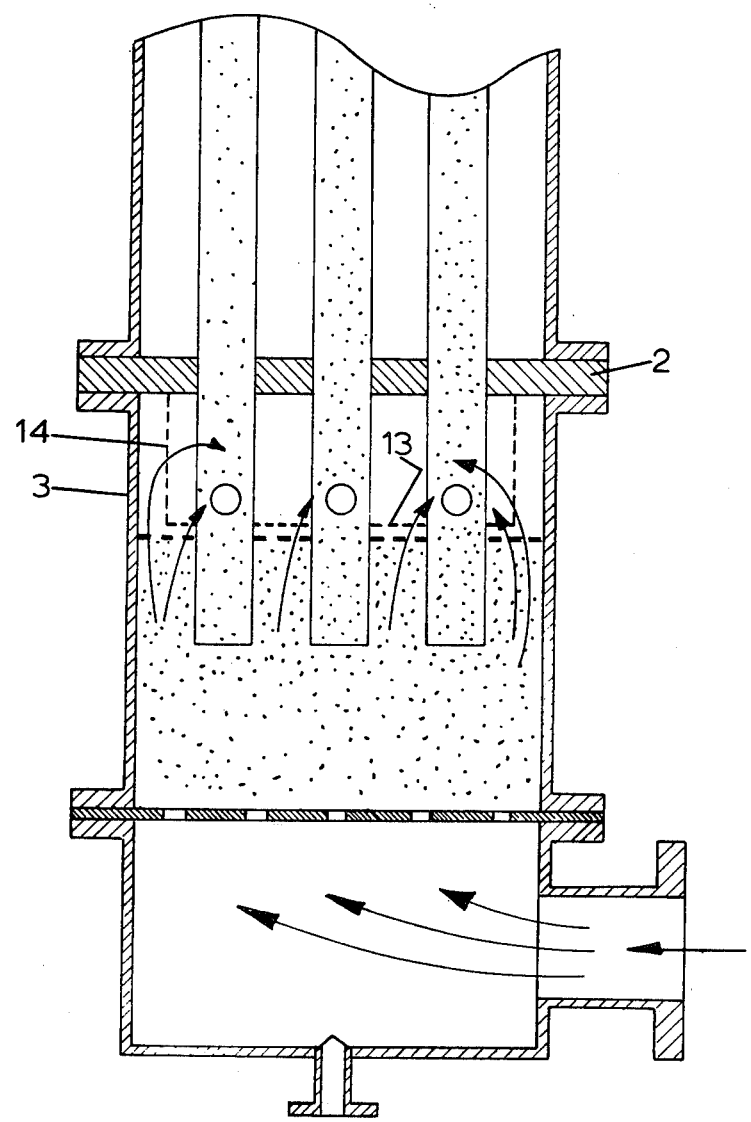

A slightly different construction is shown in FIG. 2. Apart from the screen 13, this construction corresponds entirely to that of FIG. 1. Instead of a flat horizontal screen 13, a screen in the shape of a basket is fitted, consisting of a base 13 which does not extend across the entire transverse area of the lower box 3 but at its edge is joined to a skirt 14 which is fastened at its top edge to the partition 2. The screen area is thereby appreciably enlarged so that, as indicated by the arrows, the first heat-exchanging medium can spread over a larger area when passing through the screen. The likelihood of this screen being fouled and silting up is therefore appreciably reduced.

Figure 3:
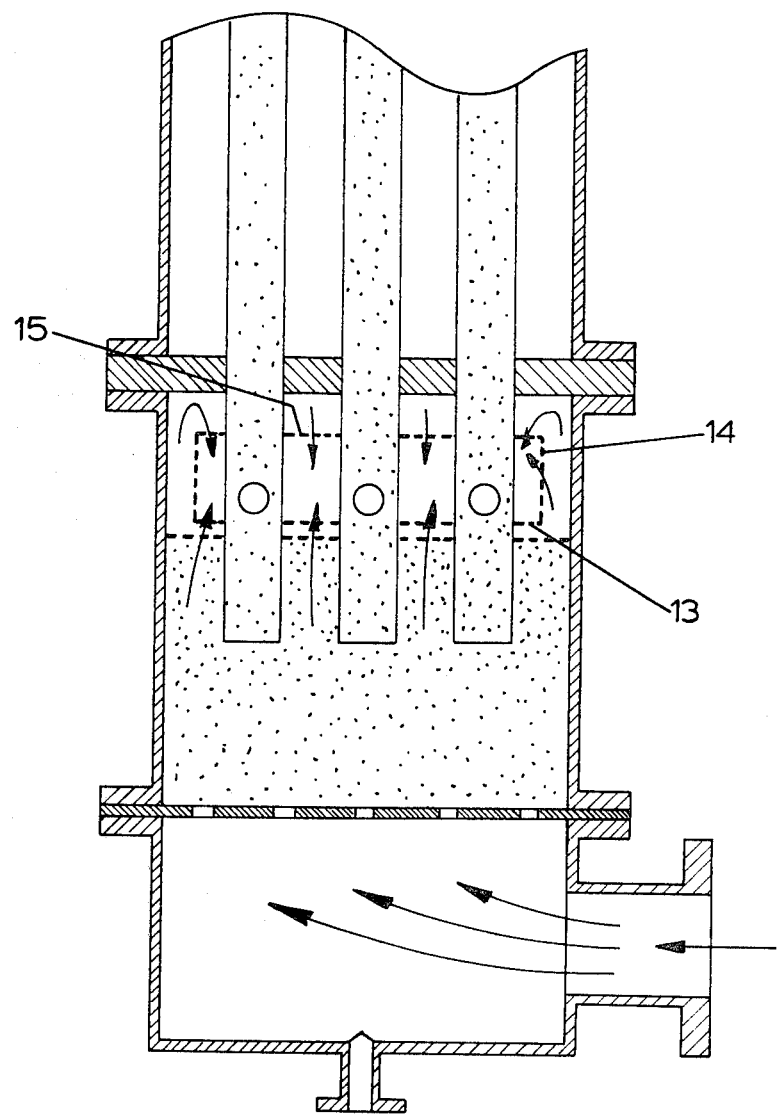

Finally, yet another embodiment in accordance with the invention is shown in FIG. 3. Again, this is the same as that of FIGS. 1 and 2 except for the screen 13, which here has a box-shape, enclosing all the stabilization openings 11.

Thus, this screen has a base 13 below the level of the openings 11, a side wall 14 extending around the openings 11 and a horizontal top 15 above the level of the openings 11. Not only does this construction further enlarge the screening area but also the screen need now not be fastened to the wall 2. It may now be slid over the pipes 4 as a separate element, and fixed to them.

What is claimed is:

1. Heat exchanger having a plurality of vertical pipes for upward passage of a first heat-exchanging medium, at least one compartment for passage of a second heat-exchanging medium through which compartment said pipes extend, a lower chamber through which said first medium passes and into which said pipes open for admission to the pipes of said first medium, and a flow distribution element adapted to distribute the flow of said first medium in said lower chamber to the pipes, there being present a fluidizable particulate material which, in operation, is maintained in a fluidized state in the pipes by the flow of the first medium and the pipes having inlet elements extending downwardly into said lower chamber with their lowermost ends open and there being stabilization openings into said inlet elements above said open lowermost ends thereof, said stabilization openings being separated, outside the inlet elements, from the said open lowermost ends of the inlet elements by at least one screen which allows flow of the first medium to the stabilization openings.

2. Heat exchanger according to claim 1 wherein the screen has apertures of area smaller than that of the stabilization openings.

3. Heat exchanger according to one of claims 1 and 2 wherein said screen has a basket shape with a base portion and a side portion, the side portion being closed at its upper edge to an upper wall of the lower chamber.

4. Heat exchanger according to one of claims 1 and 2 wherein said screen has top, bottom and side portions above, around and below the stabilization openings.

* * * * *